United States Patent [19]
Seki

[11] Patent Number: 5,988,032
[45] Date of Patent: Nov. 23, 1999

[54] SLOTTING TOOL

[75] Inventor: Masayuki Seki, Kanagawa, Japan

[73] Assignee: Amada Metrecs Company, Limited, Kanagawa, Japan

[21] Appl. No.: 08/798,926

[22] Filed: Feb. 11, 1997

[30] Foreign Application Priority Data

Feb. 13, 1996 [JP] Japan ..................................... 8-025657
Jul. 22, 1996 [JP] Japan ..................................... 8-192374

[51] Int. Cl.⁶ ..................................................... B26F 1/14
[52] U.S. Cl. ............................... 83/583; 83/682; 83/689; 83/916
[58] Field of Search .............................. 83/916, 583, 689, 83/682

[56] References Cited

U.S. PATENT DOCUMENTS

| | | | |
|---|---|---|---|
| 1,139,572 | 5/1915 | Perry | 83/583 |
| 3,426,633 | 2/1969 | Jores | 83/583 |
| 5,400,682 | 3/1995 | Matsuura . | |
| 5,499,566 | 3/1996 | Endo et al. | 83/916 |

FOREIGN PATENT DOCUMENTS

| | | |
|---|---|---|
| 0 639 413 A1 | 2/1995 | European Pat. Off. . |
| 858107 | 11/1940 | France ..................................... 83/916 |
| 477536 | 5/1929 | Germany .................................. 83/583 |
| 63-130228 | 6/1988 | Japan . |
| 7-51766 | 2/1995 | Japan . |
| 7-23058 | 5/1995 | Japan . |

OTHER PUBLICATIONS

European Search Report dated Jun. 16, 1997 (3 pages).

*Primary Examiner*—Kenneth E. Peterson
*Attorney, Agent, or Firm*—Blank Rome Comisky & McCauley LLP

[57] ABSTRACT

A slotting tool to slot a workpiece and cut off a slotted scrap from the workpiece comprising a punch having a toe portion and a heel portion located higher than the toe portion and a slotting portion located between the toe portion and the heel portion; a die having a starting blade to punch out a tip portion of the slotted scrap from the workpiece by cooperating with the toe portion to shear the workpiece; side blades to slot the workpiece by cooperating with the slotting portion to slot the workpiece; a terminating blade to cut off the slotted scrap by cooperating with the heel portion; a scrap cutting blade mounted to the die, the scrap cutting blade located below the starting blade for cooperating with the toe portion to cut off a tip portion of the slotted scrap; and a scrap path formed in the die, the scrap path locating under the starting blade to receive the tip portion of the slotted scrap.

3 Claims, 10 Drawing Sheets

FIG.17

SLOTTING TOOL

BACKGROUND OF THE INVENTION

1. Field of the Invention

The present invention relates to a slotting tool for use in slotting a work.

2. Description of the Related Art

A slotting tool of the related art is constructed in a manner such that a toe of a punch does not cooperate with a die to preliminarily punch out a work. The slotting tool slots the work by means of a slotting portion of the punch and the die. Slotted scrap is punched out for cutting off from the work by means of a heel portion of the punch and the die. Therefore, the slotting tool does not work from a slotting starting position in the work. In this connection, prior to slotting the work by the slotting tools of the related art, an auxiliary and extra hole must be prepared which is located in an extension line of and overlapping the slot to be formed.

In another type of slotting tool, a repeated slotting operation is performed from a hole preliminarily and previously punched for slotting. This is required because incomplete slotting scrap is left on a work at the final stage of the continuous slotting operation, notwithstanding that this type of slotting tool does not require an auxiliary and extra hole. Therefore, the extra auxiliary hole, which is located in an extension line of the slotted hole required and overlaps with the slotted hole required, must be punched at a final and terminating slotting position, prior to slotting the work by the slotting tool.

The above slotting operations of the related art are thus complicated thereby increasing the cost of the slotting operations.

Furthermore, where a second slotted hole is required near a first slotted hole and where a micro-joint portion is required on a work and formed on the work by the first slotted hole, the micro-joint portion cannot remain on the work and therefore is not formed on the work where an auxiliary and extra hole is required.

In addition, the preliminarily punched slotted holes are typically uneven thereby reducing the accuracy of the hole.

SUMMARY OF THE INVENTION

Accordingly, an object of the present invention is to solve the above-described problems and provide a slotting tool which is able to start the slotting operation from any position without a preliminarily punched hole prior to the slotting operation.

It is another object of the invention to provide a slotting tool which is able to terminate the slotting operation at any position without a auxiliary hole prior to the slotting operation.

It is still another object of the invention to provide a slotting tool which is able to allow selecting slotting lengths freely.

It is further object of the invention to provide a slotting tool in which the scrap cutting blade is able to avoid to be worn by the tip of the slotted scrap.

To achieve the above objects of the present invention, there is provided a slotting tool for slotting a work comprising a punch having a toe portion and a heel portion at lower portion thereof, the heel portion locates higher than the toe portion, a die having a starting blade for cooperating with the toe portion to shear the work, side blades for cooperating with the slotting portion to slot the work and a terminating blade for cooperating with the heel portion to cut off the slotted scrap, scrap cutting blade disposed below the starting blade for cooperating with the toe portion to cut off the slotted scrap and a scrap path under the starting blade for receiving the slotted scrap.

The slotting tool further comprising an ejector vertically movable disposed below the toe portion for cooperating with the toe portion to push the slotted scrap and for ejecting the slotted scrap and a backup plate fixed to the die for supporting the scrap cutting blade and the ejector.

It is desirable that the scrap cutting blade has rounded portions on the bottom end portion thereof and an inclined face to be inclined when the slotted scrap push the scrap cutting blade and that the scrap cutting blade is biased downwardly by a bias means located between the backup plate and the die.

Thus, when a work is placed on the die, a position of the work in which slotting is to be started is made to coincide with the toe portion and the slotting potion of the punch and then the punch is descent to start the slotting. At this time, the punch is descent at such a stroke that the punch does not wholly bite the work. After the punch ascend, the work is fed by a distance less than a predetermined slotting length. Then the slotted scrap is inserted into the scrap path located under the starting blade.

Next, the punch is further descent only slightly such that the slotting scrap in the scrap path is cut off by the toe portion of the punch and the scrap cutting blade.

The above operation is repeated such that the work is moved and then is punched each time. As the press stroke for the final cutting is set to be larger than the previous ones, in a final slotting operation, the heel portion of the punch is descent so that the slotted scrap is wholly cut off by the heel portion of the punch and the terminating blade, thereby the slotting operation is completed.

As a result, a preliminary and previous hole in the starting and terminating points becomes unnecessary so that an occurrence of an unevenness on a slotting surface can be avoided. Further the slotting length can be selected as desired.

During the punch is ascending upwardly after the toe portion has cooperated to cut off the slotted scrap, the scrap cutting blade is swung and inclined so that the scrap cutting blade is able to avoid to be jammed with the tip of the slotted scrap.

As the result, the scrap cutting blade is able to avoid to be worn by the tip of the slotted scrap, thereby the life cycle of the slotting tool is elongated.

DETAILED DESCRIPTION OF THE PREFERRED EMBODIMENTS

Figure 1:
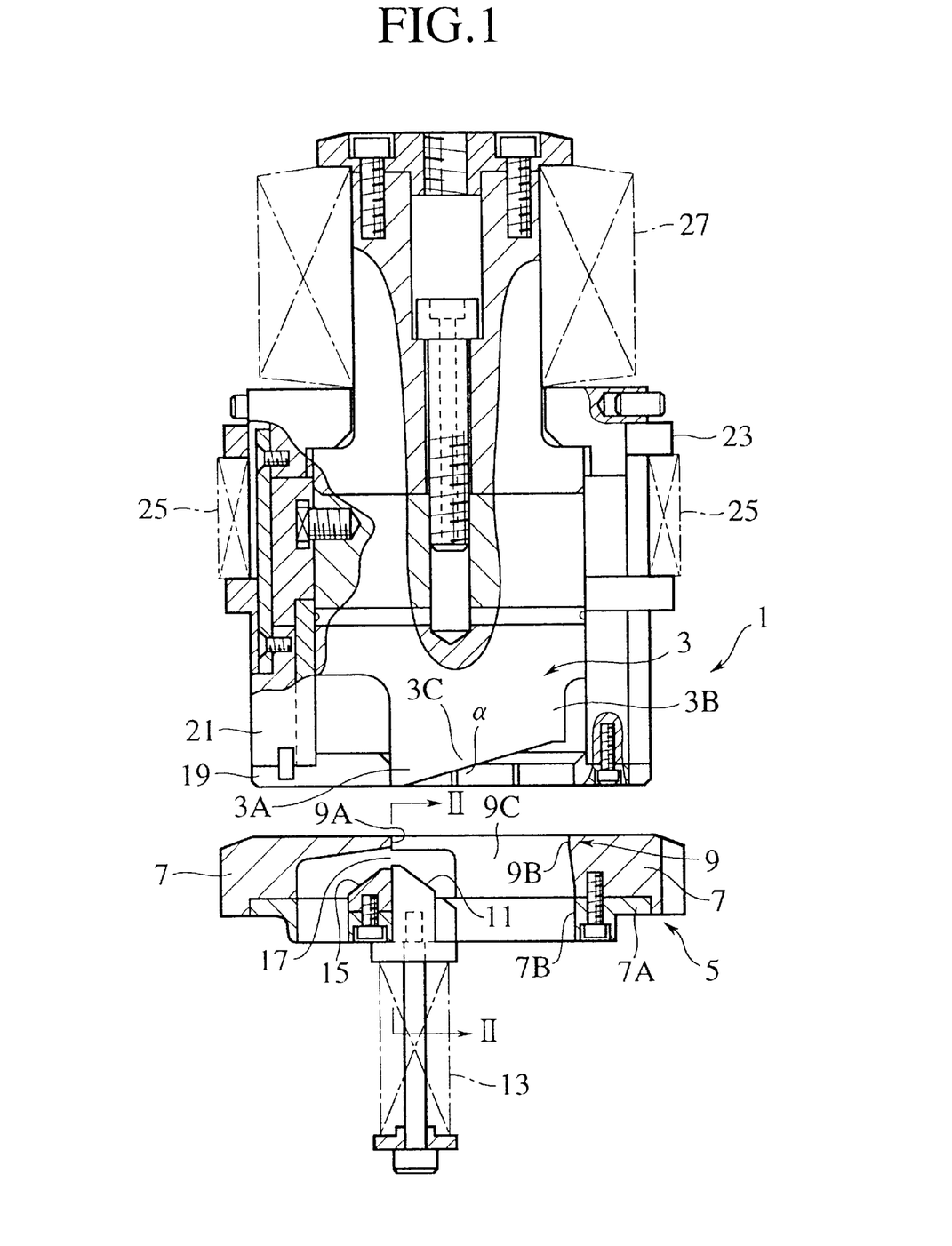
FIG. 1 is a front view of a slotting tool according to the present invention.
Figure 2:
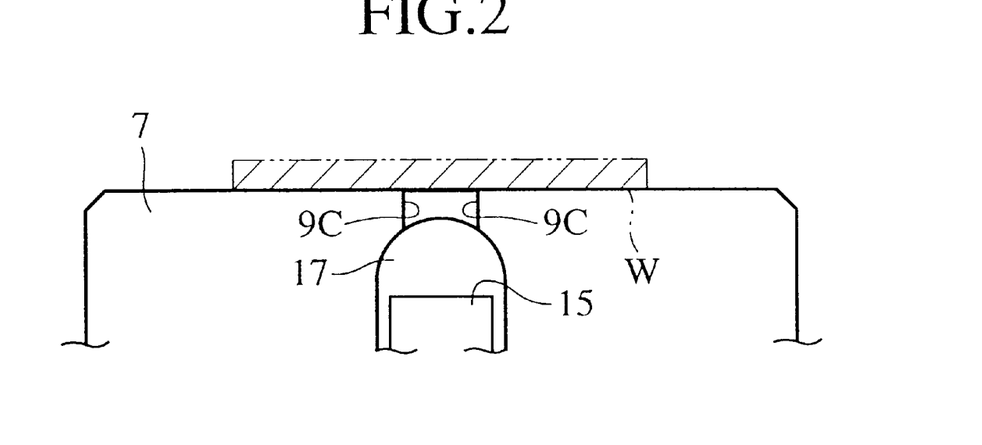
FIG. 2 is a sectional view of the slotting tool, taken along the line 11—11 in FIG. 1.
Figure 3:
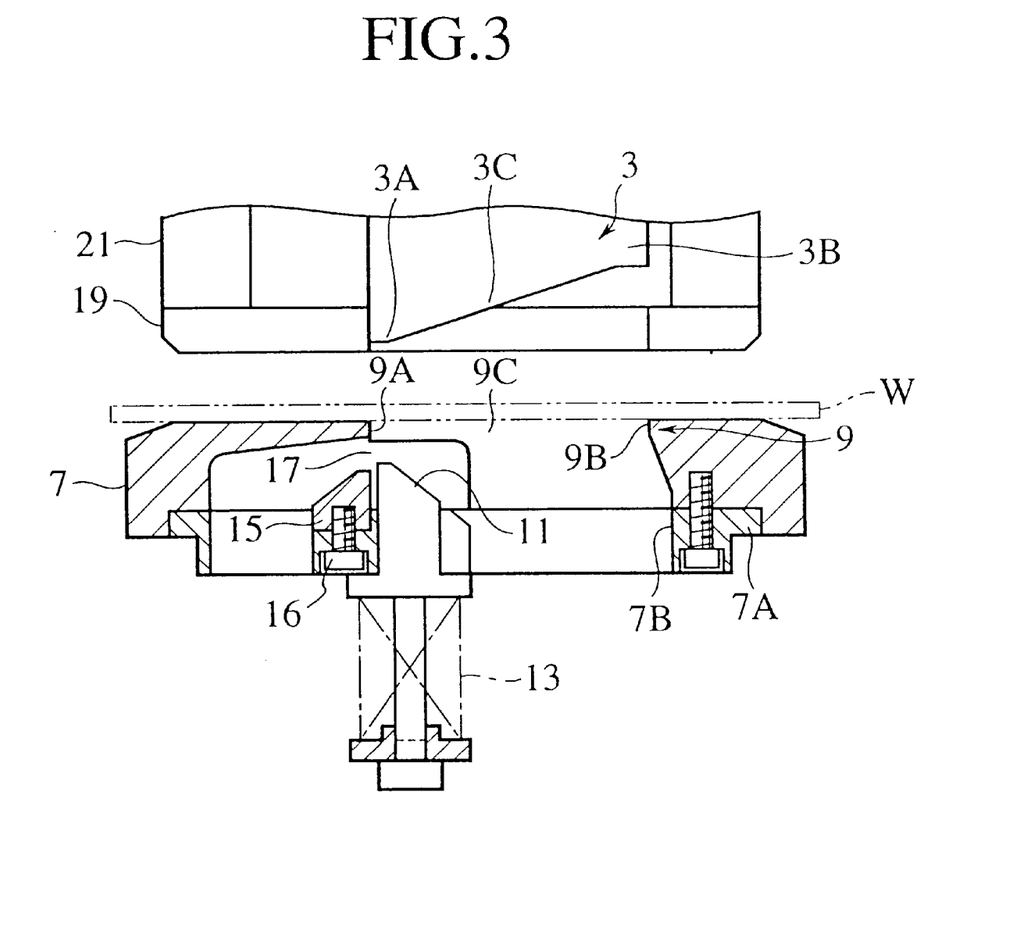
FIG. 3 is a partial front view of the slotting tool for explaining a slotting operation on a work by a toe portion of a punch.

Hereinafter, preferred embodiments of the present invention will be described in details with reference to the accompanying drawings. Referring to FIGS. 1 and 2, a slotting tool I comprises punch 3 vertically movable and die unit 5. The punch 3 is constructed so that its stroke can be set freely by means of a hydraulic cylinder or the like well known in the art. The punch 3 has a shear angle α at its bottom end portion so that heel portion 3B of punch 3 does not bite completely into the work to be slotted when the bottom stroke of the punch 3 is controlled to be driven vertically.

The die unit 5 comprises die 7 which has a blade 9 on a top surface thereof, blade 9 including starting blade 9A, side blades 9C and a terminating blade 9B. The starting blade 9A cooperates with toe portion 3A of punch 3 to shear the work to be slotted as a starting stage of the slotting operation.

The side blades 9C cooperate with a slotting portion 3C of punch 3 to slot the work continuously as a middle stage of the slotting operation.

The terminating blade 9B cooperates with heel portion 3B of punch 3 to punch out the work to be slotted as a final and terminating stage of the slotting operation so that the slotted scrap is removed and dropped from the work.

A backup plate 7A is provided on a bottom of die 7. A hole 7B is formed almost in the center of the backup plate 7A. In hole 7B, an ejector 11 is provided so as to be movable vertically and further urged upward by springs 13. The ejector 11 may be so constructed as to be moved vertically by air cylinders or the like. In this case, ejector 11 is moved vertically in synchronism with motions of punch 3. A scrap cutting blade 15 is disposed such that it is in contact with ejector 11 with a slightly narrow shearing gap therebetween.

The backup plate 7A supports ejector 11 and scrap cutting blade 15. The construction described above is not restricted to the embodiment but it can be constructed in such a manner that each of the ejector 11 and scrap cutting blade 15 is supported by a working table of a punching press or by a turret of a turret punching press.

FIG. 2 is. a sectional view of FIG. 1 taken along the line II—II, showing that a work W is placed on die 7. The side blades 9C of die 7 are disposed on the right and left sides so as to oppose each other, so that punch 3 and side blades 9C cooperate with each other to continuously slot the work when the punch (not shown) descends.

A scrap path 17 is formed below the starting blade 9A to receive the scrap slotted from the work. As shown in FIG. 2, the scrap cutting blade 15 is located in scrap path 17 of the die 7. The scrap cutting blade 15 cuts a slotting scrap to a predetermined length and discharges it in cooperation with toe portion 3A of punch 3 when the punch 3 descends deeply to the lower bottom point.

In slotting operation, stripper plate 19 and a punch guide 21 are forced by flange 23 so that they descend. Then, stripper plate 19 makes contact with die 7 through work W. After that, stripper plate 19 is urged downward by means of lifter spring 25 such that work W is firmly grasped. After that, only punch 3 continues to descend through punch guide 21 and further descends against an urging force of stripper spring 27 so as to cut work W in cooperation with die 7.

Referring now to FIGS. 3, 4, 5, 6, 7, 8 and 9, the operation of the slotting on the work W is explained in more detail. The work W is placed on a top surface of the die 7. In this stage, the punch 3, the stripper plate 19 and the punch guide 21 are ascended so that they are not in contact with the work W.

Figure 4:
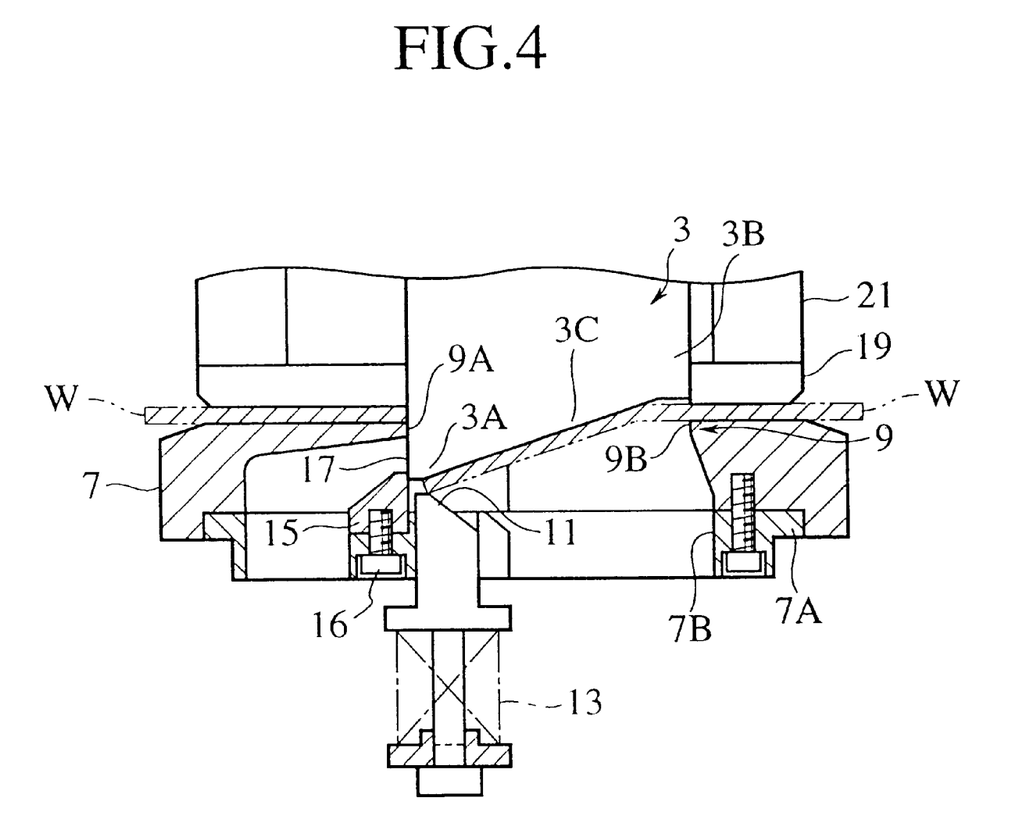
FIG. 4 is a partial front view of the slotting tool for explaining a slotting operation on a work by a slotting portion of a punch.

Next, as shown in FIG. 4, punch guide 21 and stripper plate 19 descend and grasp the work W in cooperation with the die 7. Successively, toe portion 3A of the punch 3 descends to shear the work W in cooperation with starting blade 9A, and slotting portion 3C of punch 3 descends to slot the work W in cooperation with side blades 9C (not shown here because they are hidden by the punch 3). As shown in FIG. 4, the punching of slitting can be started from any position in the work W. Therefore, a preliminary hole as a auxiliary and extra hole to be punched out in a previous stage is not required. At this time, the slotted scrap of the work W is bent downwardly at an angle almost equal to the shear angle α of punch 3.

As shown in FIG. 4, punch 3 is made to descend with small strokes such that the work W is punched through by cooperation with punch 3, starting blade 9A of die 7 and the side blades 9C thereof (not shown because they are hidden by the punch 3). At this time, the heel portion 3B of punch 3 remains above the terminating blade 9B such that it does not incise the work W.

Figure 5:
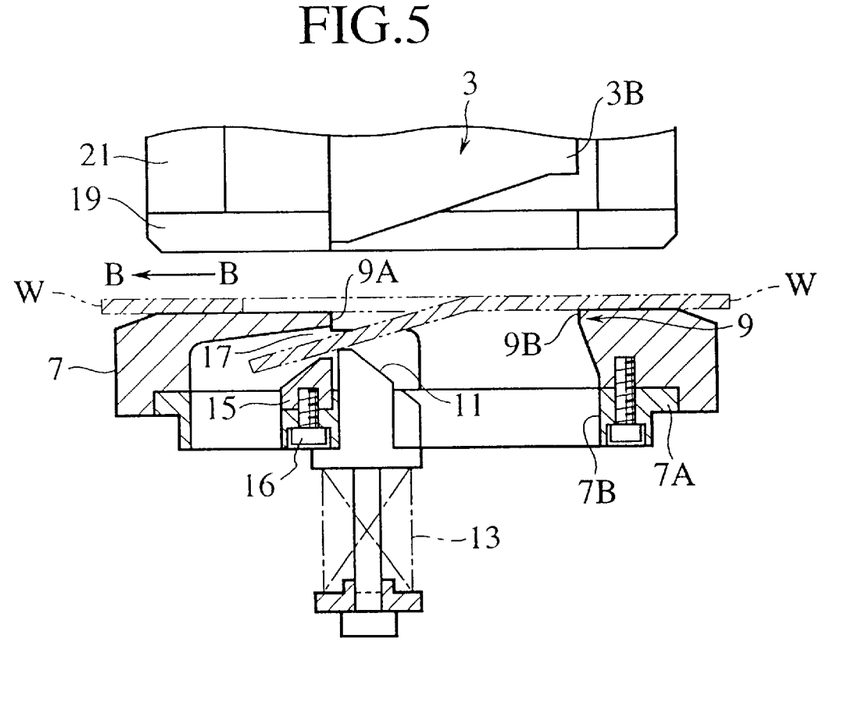
FIG. 5 is a partial front view of the slotting tool for explaining the slotted scrap is inserted to a scrap path.

After the punch 3, punch guide 21 and the stripper plate 19 ascend as shown in FIG. 5, the work W is fed at a smaller distance than a predetermined cutting length in a direction of the arrow B—B or to the left in FIG. 5. A tip portion of the slotted scrap enters the scrap path 17.

Figure 6:
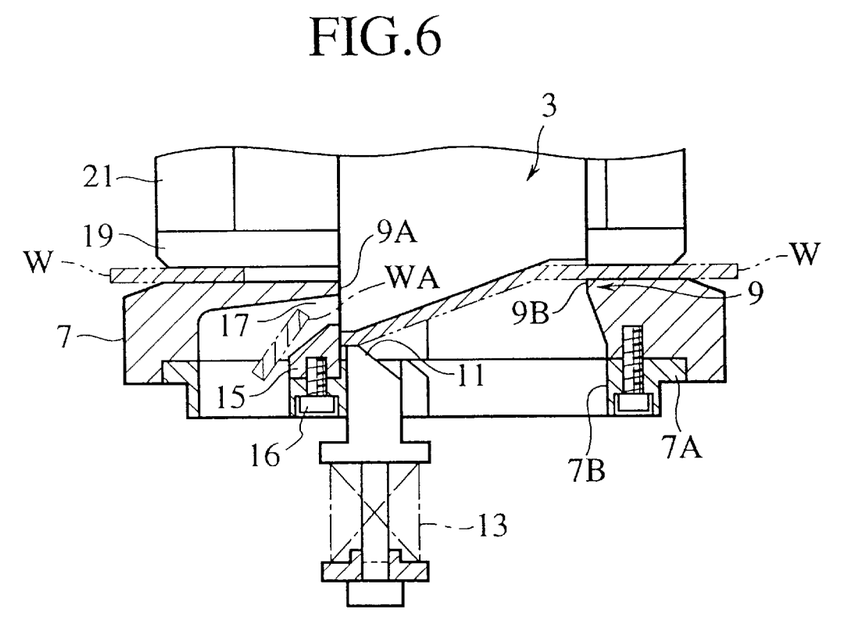
FIG. 6 is a partial front view of the slotting tool for explaining the slotted scrap is cut off by a scrap cutting blade.

As shown in FIG. 6, punch 3 grasps the work W in cooperation with ejector 11 and further descends, so that toe portion 3A of punch 3 cuts off the tip portion WA of the slotted scrap in cooperation with scrap cutting blade 15. The tip portion WA of the slotted scrap is dropped downwardly through scrap path 17. At the same time, the work W is slotted further by means of slotting portion 3C and the slide blades 9C.

Figure 7:
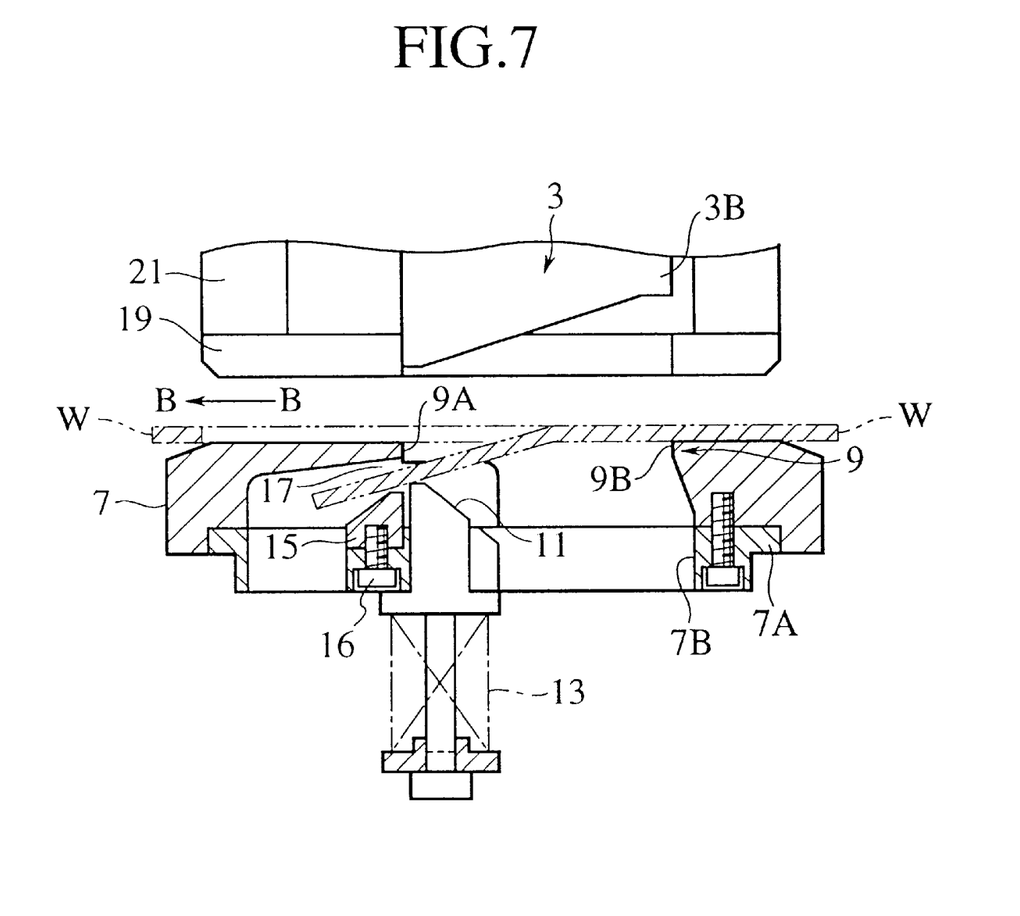
FIG. 7 is a partial front view of the slotting tool for explaining the slotted scrap is inserted to the scrap path.

As shown in FIG. 7, after punch 3, punch guide 21 and stripper plate 19 ascend, the work W is fed further by only the cutting length in the direction of the arrow B—B or to the left in FIG. 7. The next tip portion of the slotted scrap enters scrap path 17. At the same time, a portion to be ripped newly of the work W advances below the slitting portion 3C of punch 3. As shown in FIG. 6, the punch 3 descends again slightly deep and slots the work W, so that the slotted portion of the work W is elongated. Then the slitting operations as shown in FIGS. 5, 6, and 7, are continuously repeated.

Figure 8:
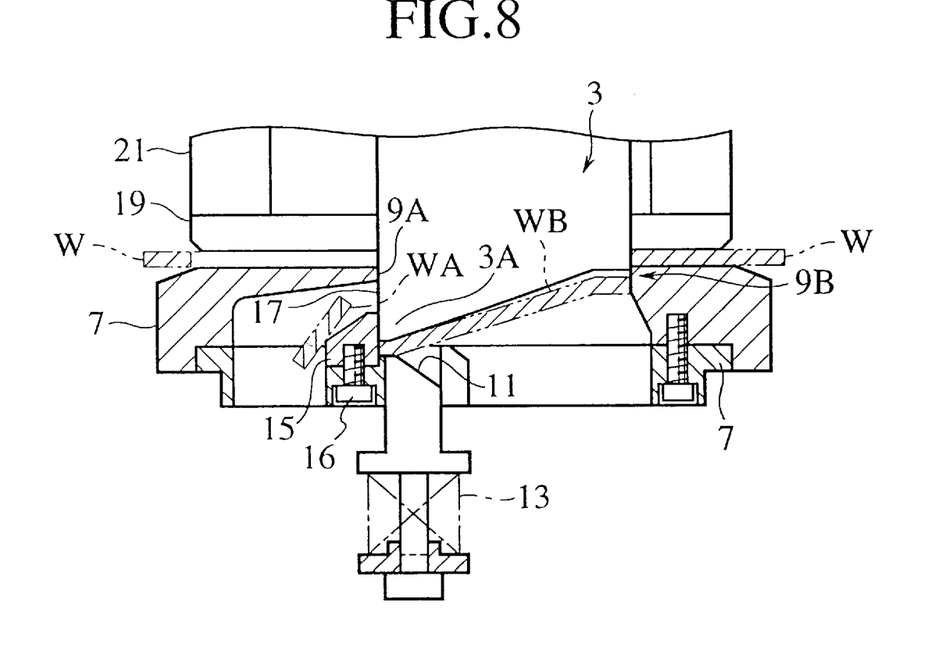
FIG. 8 is a partial front view of the slotting tool for explaining the slotted scrap is completely punched out by a heel portion of the punch.
Figure 9:
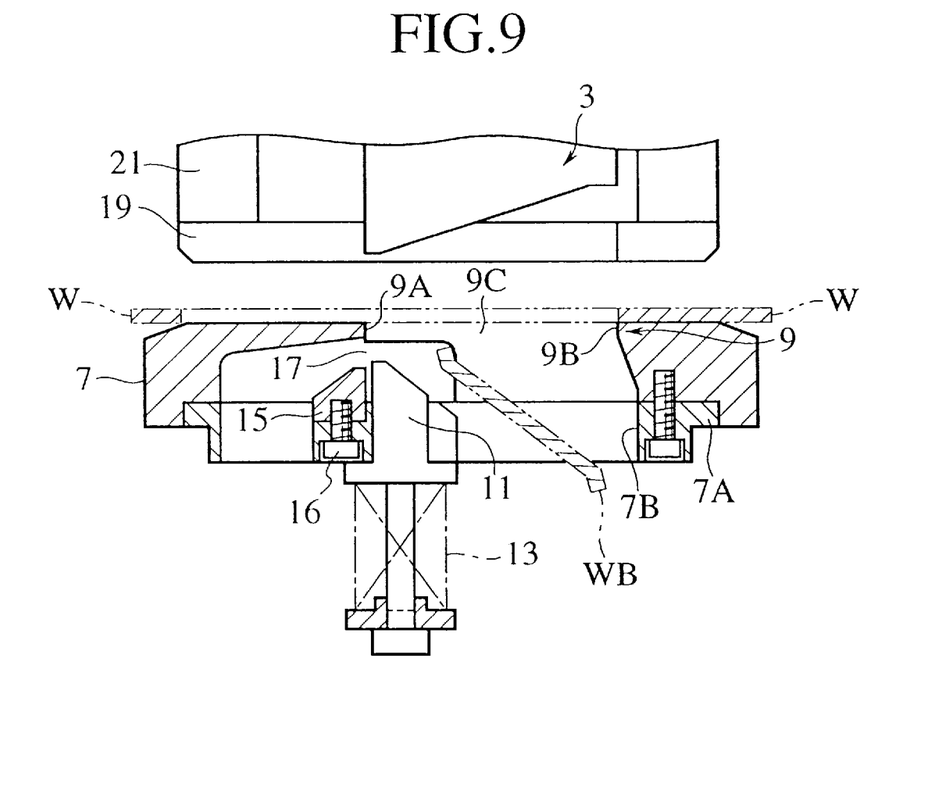
FIG. 9 is a partial front view of the slotting tool for explaining the completely punched out scrap is dropped downwardly.

Referring to FIGS. 8 and 9, when the work W is ripped at a final end thereof, the punch 3 is made to descend to the bottommost such that heel portion 3B of punch 3 cooperates with terminating blade 9B to cut off the scrap WB. The slotting scrap is also cut off by means of the toe portion 3A and the scrap cutting blade 15 and separated as the scrap WA and a scrap WB. The scrap WB is dropped downwardly through hole 7B of the die 7. Then, the slotting operation is terminated.

As described above, by operations shown in FIGS. 3 to 9, as the first stage of the slotting operation, the work W is sheared by starting blade 9A and the tip portion of the slotted scrap to be cut off enters the scrap path 17. Thus, there is no case where the slotting scrap and protective vinyl covering the work surface jump out upward to interrupt the continuous slotting operation as in the related art. Further, air blow for removing the scattered slotting scrap WA and the vinyl becomes unnecessary. Still further, it is not necessary to preliminarily make a starting hole.

Figure 10:
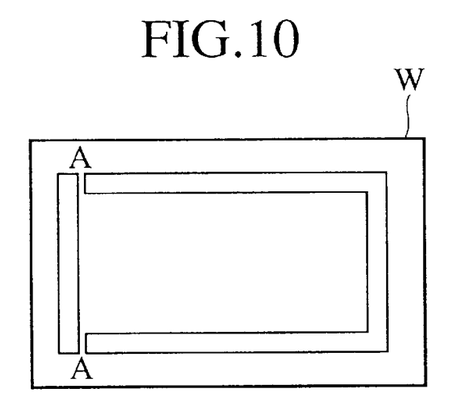
FIG. 10 is a plan view of a work processed by the slotting operation of the present invention.
Figure 11:
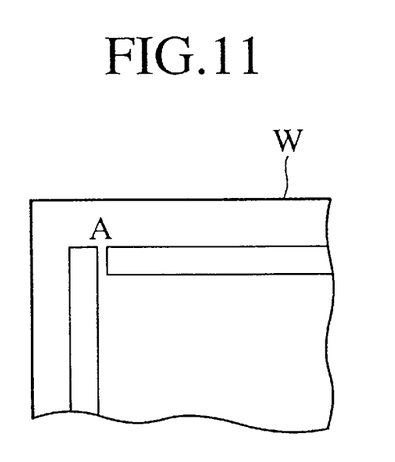
FIG. 11 is an enlarged view of a micro-joint portion shown in FIG. 10.
Figure 12:
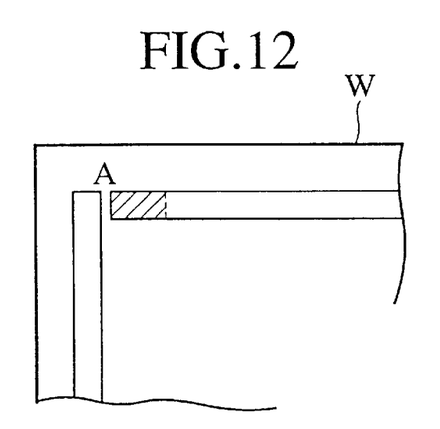
FIG. 12 is an enlarged view of a micro-joint portion shown in FIG. 10.

At the final punching stage after the slitting operation is repeated up to the predetermined cutting length, the final end portion is cut and separated in cooperation with terminating blade 9B and punch 3 with the press stroke is set large as shown in FIGS. 8 and 9. Thus, it is not necessary to preliminarily make a auxiliary and extra hole in the final end portion of the slotted hole. FIG. 10 shows a plan view of the work W processed by means of the slotting tool according to the present invention. Portion A indicates the micro-joint portion. FIG. 11 is an enlarged view of the micro-joint portion of FIG. 10. FIG. 12 shows part of FIG. 11 indicating that slotting operation can be started from a cross-hatched part in the vicinity of the micro-joint A because a pretreatment is not necessary, so that there occurs no unevenness on its slotting surface.

As understood by the description of the embodiments, the slotting tool according to the present invention has eliminated a necessity of the auxiliary holes in the starting position and terminating position on a preceding stage and a possibility of scattering of slotted scraps. Thus, interruptions of slotting work for cleaning or the like are eliminated and further grinding work on post stage has become unnecessary because there is not an unevenness on the slotting surface. Consequently, the slotting process is simplified and further an accuracy in finished products can be improved tremendously. Still further it is possible to determine the slotting length as desired.

Referring now to FIGS. 13 to 17, the second embodiment is explained hereinafter.

Figure 13:
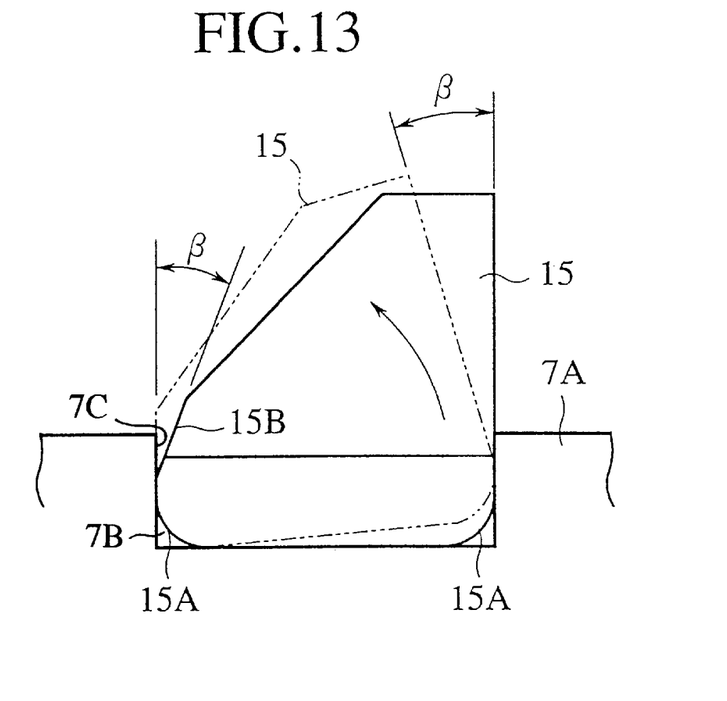
FIG. 13 is an enlarged front view of a scrap cutting blade shown as a second embodiment of the present invention.
Figure 14:
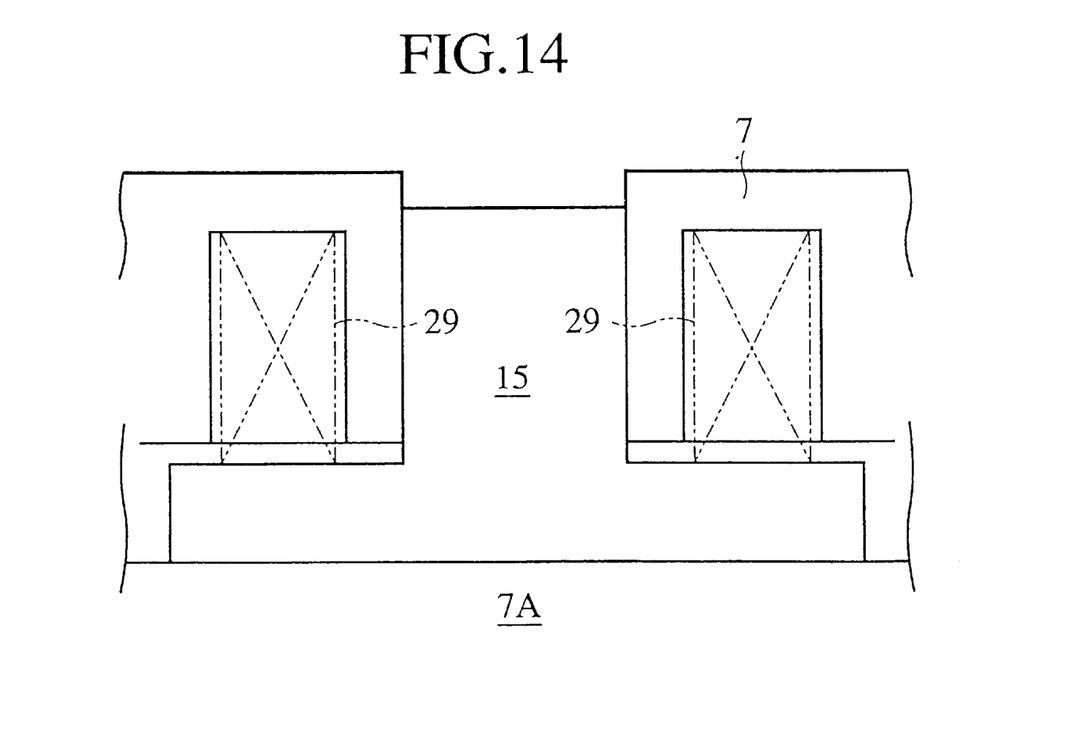
FIG. 14 is an enlarged side view of a scrap cutting blade shown in FIG. 13.
Figure 15:
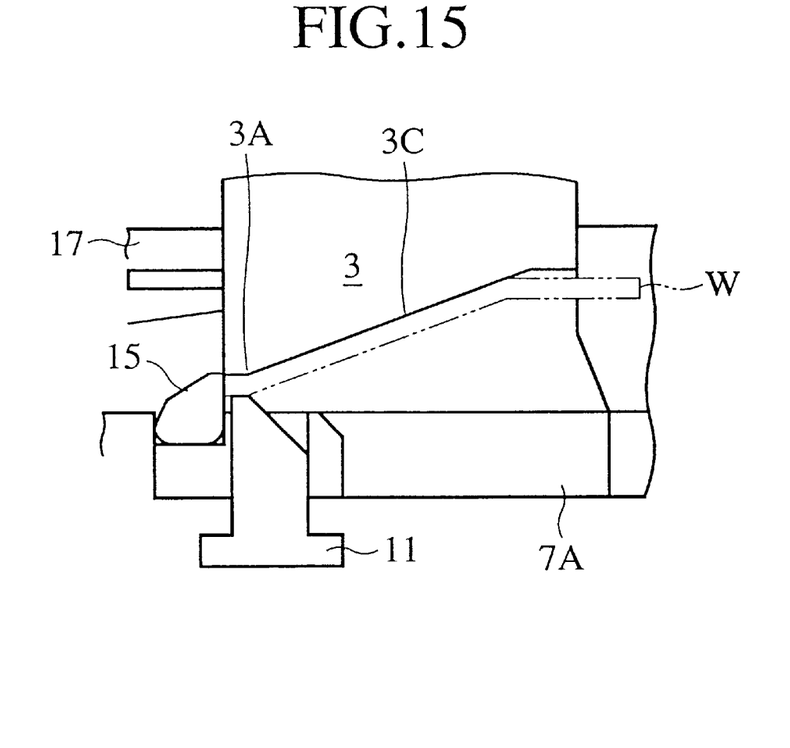
FIG. 15 is a partial front view of the slotting tool for explaining the s-iotted scrap is cut off by the scrap cutting blade of the second embodiment.

In the second embodiment, the scrap cutting blade is improved as shown in FIG. 13. The scrap cutting blade 15 is swingably received in a recess 7B having an upright wall 7C formed in the backup plate 7A of the die 7. Scrap cutting blade 15 is formed with rounded portions ISA on the bottom end portion. Furthermore, scrap cutting blade 15 is formed with inclined face 15B inclining to the upright wall 7C with an angle β as shown in FIG. 13. Scrap cutting blade 15 is biased downwardly by means of elastic members 29 as springs which are mounted in die 7.

Figure 16:
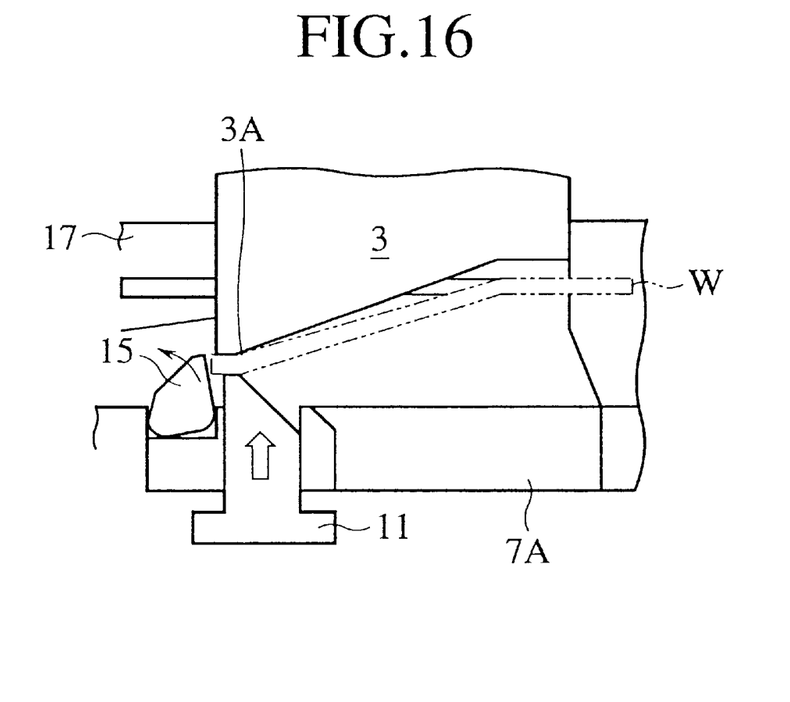
FIG. 16 is a partial front view of the slotting tool for explaining the scrap cutting blade is inclined from an original attitude to avoid the jamming with the slotted scrap when the slotted scrap is pushed upwardly by an ejector.
Figure 17:
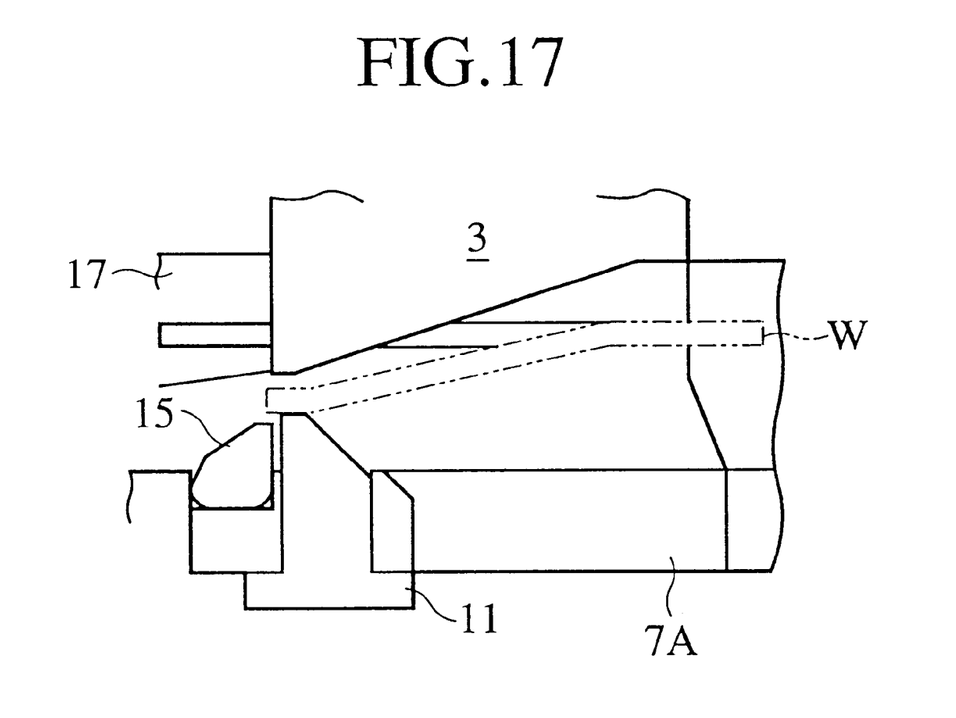
FIG. 17 is a partial front view of the slotting tool for explaining the scrap cutting blade is in the original attitude.

In this connection, when punch 3 ascends upwardly after toe portion 3A has cooperated to cut off the slotted scrap (FIG. 15), the tip portion of the slotted scrap is slightly extended and thus pushes the scrap cutting blade 15. See FIG. 16. Scrap cutting blade 15 is swung and inclined in a counter-clockwise motion as shown in FIG. 16. The attitude of scrap cutting blade 15 while inclined is shown by a dotted line in FIG. 13. The inclination angle is /3 which equals to the inclination angle of the inclined face 15B. Furthermore, scrap cutting blade 15 is swung and inclined around the center of the curvature of rounded portion 15A nearer inclined face 15B.

The slotted scrap is moved upwardly by means of ejector 11 without jamming with scrap cutting blade 15. Therefore, scrap cutting blade 15 is able to avoid to be worn by the tip of the slotted scrap, thereby the life cycle of the slotting tool is elongated.

As the result of use of the improved slotting tool, tipping of the scrap cutting blade 15 does not occur where work W is made of stainless steel with a 1.5 to 2.0 mm thickness, the scrap cutting blade 15 is made of alloy tool steel for hot dies (SKD-II) with Rockwell hardness 56, and testing amounts (hits) are 10,000 times.

The present invention is not restricted to the above described embodiments but can be embodied in other forms by appropriate modification.

What is claimed is:

1. A slotting tool to slot a workpiece and cut off a slotted scrap from the workpiece comprising:

a punch having a toe portion, and a heel portion located higher than the toe portion and a slotting portion located between the toe portion and the heel portion;

a die having a starting blade to punch out a tip portion of the slotted scrap from the workpiece by cooperating with the toe portion to shear the workpiece, side blades to slot the workpiece by cooperating with the slotting portion to slot the workpiece and a terminating blade to cut off the slotted scrap by cooperating with the heel portion;

a scrap cutting blade mounted on the die, the scrap cutting blade located below the starting blade for cooperating with the toe portion to cut off a tip portion of the slotted scrap; and a scrap path formed in the die, the scrap path located under the starting blade to receive the tip portion of the slotted scrap; wherein the die is formed with a recess having an upright wall, said recess pivotably receiving the scrap cutting blade;

the scrap cutting blade has rounded portions on the bottom end portion thereof; and the scrap cutting blade has an inclined face inclined to the upright wall so that the scrap cutting blade is pivoted when the slotted scrap pushes the scrap cutting blade.

2. A slotting tool as claimed in claim 1, further comprising:

a bias member located between the scrap cutting blade and the die to swing the scrap cutting blade so that the scrap cutting blade returns to the state where the scrap cutting blade is not swung.

3. A slotting tool to slot a workpiece and cut off a slotted scrap from the workpiece comprising:

a punch having a toe portion, and a heel portion located higher than the toe portion and a slotting portion located between the toe portion and the heel portion;

a die having a starting blade to punch out a tip portion of the slotted scrap from the workpiece by cooperating with the toe portion to shear the workpiece, side blades to slot the workpiece by cooperating with the slotting portion to slot the workpiece and a terminating blade to cut off the slotted scrap by cooperating with the heel portion;

a scrap cutting blade mounted on the die, the scrap cutting blade located below the starting blade for cooperating with the toe portion to cut off a tip portion of the slotted scrap; and an ejector vertically movably mounted on the die, the ejector located below the toe portion to push up the slotted scrap and to eject the slotted scrap by cooperating with the toe portion, wherein the die is formed with a recess having an upright wall, said recess pivotably receiving the scrap cutting blade;

the scrap cutting blade has rounded portions on the bottom end portion thereof; and the scrap cutting blade has an inclined face inclined to the upright wall so that the scrap cutting blade is pivoted when the slotted scrap pushes the scrap cutting blade.

* * * * *